(12) United States Patent
Bebek et al.

(10) Patent No.: US 12,017,353 B2
(45) Date of Patent: Jun. 25, 2024

(54) ACTUATOR EMBODIMENT FOR USE IN ROBOT SYSTEMS

(71) Applicant: OZYEGIN UNIVERSITESI, Istanbul (TR)

(72) Inventors: Ozkan Bebek, Istanbul (TR); Alihan Kuru, Istanbul (TR); Barkan Ugurlu, Istanbul (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 0 days.

(21) Appl. No.: 18/013,276

(22) PCT Filed: Dec. 31, 2020

(86) PCT No.: PCT/TR2020/051485
§ 371 (c)(1),
(2) Date: Dec. 28, 2022

(87) PCT Pub. No.: WO2022/146262
PCT Pub. Date: Jul. 7, 2022

(65) Prior Publication Data
US 2023/0271316 A1    Aug. 31, 2023

(51) Int. Cl.
*B25J 9/10* (2006.01)
*B25J 9/00* (2006.01)
*B25J 9/12* (2006.01)
*B25J 13/08* (2006.01)
*B25J 17/00* (2006.01)

(52) U.S. Cl.
CPC ............ *B25J 9/126* (2013.01); *B25J 9/0006* (2013.01); *B25J 9/102* (2013.01); *B25J 13/088* (2013.01); *B25J 17/00* (2013.01)

(58) Field of Classification Search
CPC ... B25J 9/006; B25J 9/126; B25J 9/102; B25J 13/088; B25J 17/00
See application file for complete search history.

(56) References Cited

U.S. PATENT DOCUMENTS

| 8,821,338 B2 * | 9/2014 | Thorson | B25J 9/042 475/331 |
|---|---|---|---|
| 2011/0202308 A1 | 8/2011 | Kishida et al. | |

FOREIGN PATENT DOCUMENTS

| CN | 111230922 A | 6/2020 | |
|---|---|---|---|
| CN | 211565962 U * | 9/2020 | ............ B25J 17/00 |
| CN | 211565962 U | 9/2020 | |
| EP | 2361736 A2 | 8/2011 | |

(Continued)

OTHER PUBLICATIONS

Machine translation of CN-211565962-U. (Year: 2020).*

*Primary Examiner* — Randell J Krug
(74) *Attorney, Agent, or Firm* — Bayramoglu Law Offices LLC

(57) ABSTRACT

An actuator particularly in order to be used in movements of joints of robot systems includes at least one drive element which provides movement and arranged as from the first side of at least one body towards the second side thereof, at least one gearbox which can arrange the movement, obtained from said drive element, at predetermined proportions, and at least one dampening element which can at least partially dampen the movement, which exists at said gearbox output, against the force being subjected to and which can transfer said movement to at least one drive cover.

4 Claims, 3 Drawing Sheets

(56) References Cited

FOREIGN PATENT DOCUMENTS

| | | | |
|---|---|---|---|
| EP | 3109980 | A1 | 12/2016 |
| JP | 2008039737 | A | 2/2008 |

* cited by examiner

ACTUATOR EMBODIMENT FOR USE IN ROBOT SYSTEMS

CROSS REFERENCE TO THE RELATED APPLICATIONS

This application is the national phase entry of International Application No. PCT/TR2020/051485, filed on Dec. 31, 2020, the entire contents of which are incorporated herein by reference.

TECHNICAL FIELD

The present invention relates to an actuator particularly in order to be used in actuation of joints of robot systems and including at least one drive element which provides rotation and arranged as from the first side of at least one body towards the second side thereof, at least one gearbox which can arrange the actuation, obtained from said drive element, at predetermined proportions, and at least one dampening element which can at least partially dampen the actuation, which exists at said gearbox output, against the opposite-directional torque being subjected to and which can transfer said actuation to at least one drive cover.

BACKGROUND

Robotic systems begin to interact more with humans every passing day. Exoskeletons and rehabilitation robots take a place in human life in a manner forming symbiotic togetherness with humans beyond mutual physical interaction. These systems must be reliable and suitable for use. The actuation of such robots in a compliant manner to human movement necessitates application of torque and impedance control algorithms to robotic systems and compliancy of the used actuators to this structure.

Serial elastic actuator concept presents substantial compliance at the point of application of torque or impedance control to robotic systems. In this actuator type, an elastic component is placed in a serial manner between the motor output and the link side (mechanical output). Since the torsion on this elastic component will be directly proportional with the torque transferred by the actuator to the output, direct torque measurement and thus, torque and impedance control applications are enabled. Because of these advantages thereof, in the literature, various different serial elastic actuators exist. However, among the problems of the art, the technical difficulty of placement of encoder at the output side of the serial elastic actuators and facing of problem in the tests made can be mentioned.

In the application with number EP3109980A1 known in the art, an actuator is described for being used particularly in robotic systems. The subject matter actuator has a motor, a reduction gear. It is described that encoder is used on the subject matter actuator in order to detect the rotation angle of said actuator in a correct manner. The elastic element in the invention is a torsion rod. The power transferred from the inlet shaft is transferred to the regulator and the torsion in the output shaft is measured. In the subject matter mechanism, torque control is aimed to be realized by means of the band interval provided by the spring torsion.

In the application with number CN111230922 known in the art, a robot joint is described. This robot joint has a harmonic driver for changing speed, a motor for providing drive and an encoder for detecting rotation angle. Double shafts have been used in this structure and the measurement is directly received from the output shaft. Elastic element is not used between the harmonic drive element and the measurement is directly taken from output cover where the gearbox is connected.

In the applications with numbers CN211565962, CN111230922 known in the art, the same system design has been made and the torsion measurement has been directly associated with the output shaft and torsion measurement has been provided. As mentioned in the present art, there are various actuator models and the rotation angles can be measured by means of different methods. However, each system has disadvantages and characteristics which are open for improvement.

As a result, because of the abovementioned problems, an improvement is required in the related technical field.

SUMMARY

The present invention relates to an actuator, for eliminating the abovementioned disadvantages and for bringing new advantages to the related technical field.

An object of the present invention is to provide an actuator for use in robotic systems.

Another object of the present invention is to provide an actuator which can separately detect the rotational movement received from the drive element positioned thereon and the rotational movement received from the dampening element.

In order to realize the abovementioned objects and the objects which are to be deducted from the detailed description below, the present invention is an actuator particularly in order to be used in movements of joints of robot systems and including at least one drive element which provides movement and arranged as from the first side of at least one body towards the second side thereof, at least one gearbox which can arrange the movement, obtained from said drive element, at predetermined proportions, and at least one dampening element which can at least partially dampen the movement, which exists at said gearbox output, against the force being subjected to and which can transfer said movement to at least one drive cover. Accordingly, the improvement of the present invention is that the subject matter actuator includes at least one first shaft provided between the drive element and the gearbox and which can extend towards the first side and at least one first encoder where said first shaft and the body are connected at the first side, in order to measure detection of the output rotation received from the drive element; and at least one second shaft associated with the dampening element and which can extend towards the first side and at least one second encoder positioned at the first side of the body and associated with said second shaft, in order to measure detection of the output rotation received from said dampening element. Thus, the rotation amounts of the actuator at the output of the drive element and at the output of the dampening element can be detected. Besides, as the first encoder and the second encoder are collected at the first side of the actuator, the actuator can have a smaller volume.

In a possible embodiment of the present invention, the dampening element and the second shaft are connected to each other by means of at least one frame. Thus, the rotation due to deformation is transferred from the dampening element to the second encoder and to the drive cover.

In another possible embodiment of the present invention, said frame is connectable to at least one second hole provided on the dampening element. Thus, the rotation due to deformation is transferred from the spring element to the frame.

In another possible embodiment of the present invention, at least one fixation element is provided between the second shaft and the second encoder for providing connection in between. Thus, the second shaft and the second encoder are connected to each other.

In another possible embodiment of the present invention, the first encoder and the second encoder are provided at the first side of the body. Thus, the actuator is produced so as to have a lower volume.

In another possible embodiment of the present invention, said actuator is particularly used in exoskeleton robots. Thus, the need for an actuator in exoskeleton robots is met.

REFERENCE NUMBERS

Figure 1:
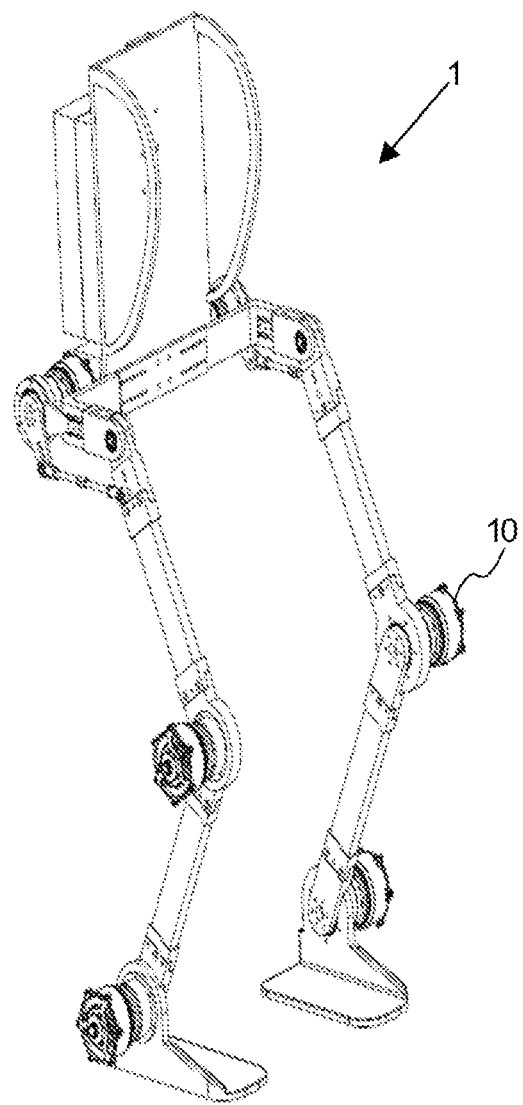
In FIG. 1, a representative perspective view of an exoskeleton robot whereon the subject matter actuator is positioned is given.

1 Robot
10 Actuator
11 Body
20 Drive element
21 First shaft
22 First encoder
30 Gearbox
31 Gearbox shaft
40 Dampening element
41 First hole
42 Second hole
50 Frame
51 Second shaft
52 Second encoder
53 Fixation element
60 Drive cover
(I) Extension direction
(II) First side
(III) Second side

DETAILED DESCRIPTION OF THE EMBODIMENTS

In this detailed description, the subject matter is explained with references to examples without forming any restrictive effect only in order to make the subject more understandable.

In FIG. 1, a representative perspective view of a robot (1) whereon the subject matter actuator (10) is positioned is given. Accordingly, the actuator (10) mentioned in the invention is particularly used in the joint locations of robot (1) systems. In a possible embodiment of the present invention, said robotic (1) system is an exoskeleton robot (1). The exoskeleton robot (1) is an auxiliary element configured to provide compliancy to the person physiology for providing support to the physical movement of persons. Said actuator (10) is associated with the two parts of such a robot (1) which has rotational freedom with respect to each other and provides movement of at least one of the parts with respect to the other one.

Figure 2:
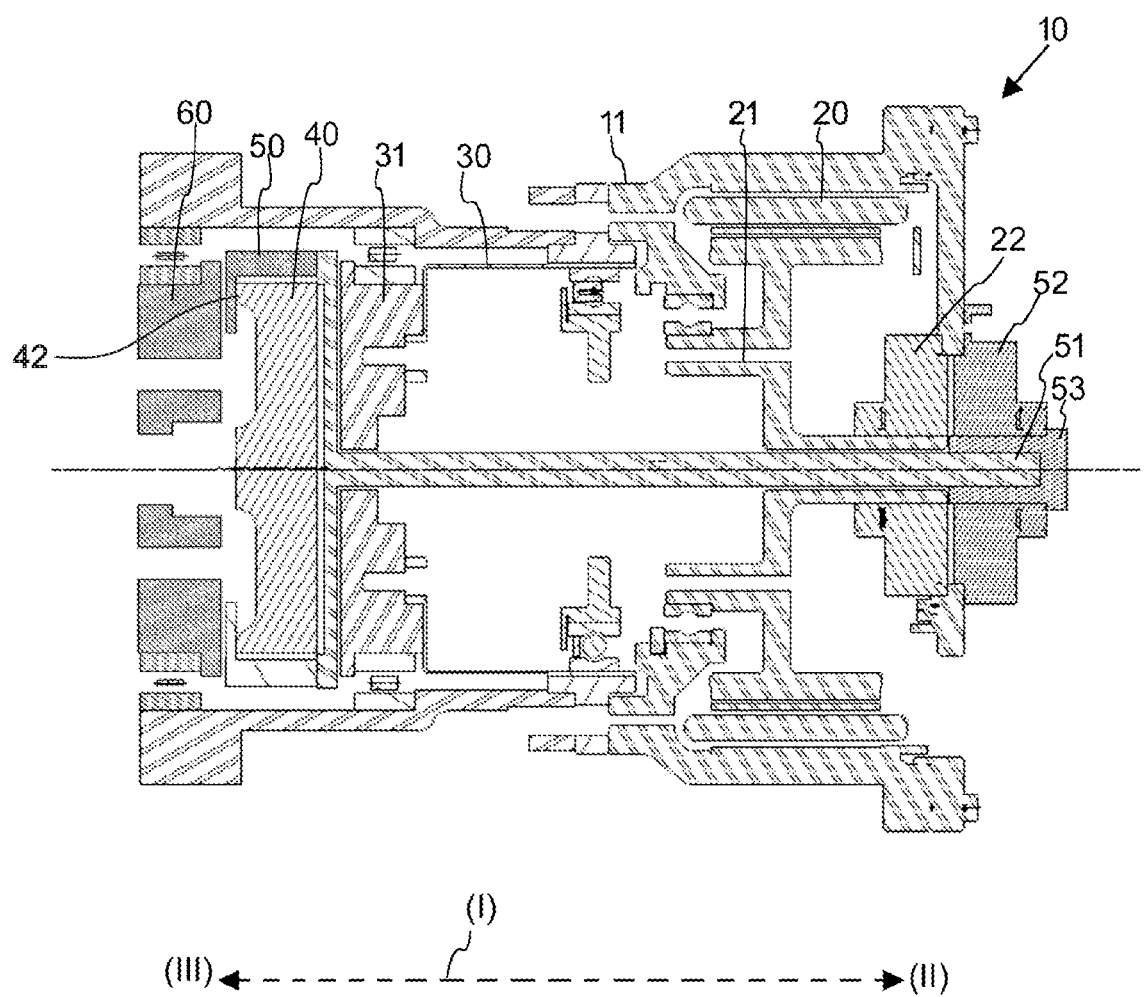
In FIG. 2, a representative cross-sectional view of the subject matter actuator is given.

In FIG. 2, a representative cross-sectional view of the subject matter actuator (10) is given. Accordingly, the actuator (10) has at least one body (11). Said body (11) at least partially covers the inner embodiment of the actuator (10) and functions as a casing. The body (11) essentially extends in an extension direction (I). Afterwards, the mutual directions of said extension direction (I) will be called as a first side (II) and a second side (III). There is at least one drive element (20), at least one gearbox (30), at least one dampening element (40) and at least one drive cover (60) arranged from the first side (II) towards the second side (III) in the same extension direction (I) in the body (11).

Said drive element (20) essentially provides the movement energy which is needed by the actuator (10). In a possible embodiment of the present invention, the drive element (20) is essentially a brushless motor. Brushless motors are preferred since they have higher speed when compared with the other motor types, they have higher torque and they operate in a silent manner. The drive element (20) is connected essentially to said gearbox (30) by means of at least one first shaft (21) in between. Said first shaft (21) directly transfers the output rotation, received from the drive element (20), to the gearbox (30). The first shaft (21) is moreover connected by means of at least one first encoder (22). Said first encoder (22) is known in the art and it is a device which can transform rotational movement into digital signal. By means of the first encoder (22), the rotational movement, received from the drive element (20), is transformed into signal. In a possible embodiment of the present invention, the first shaft (21) is connected to the gearbox (30) from one side and at the same time, it extends towards the first side (II). The first encoder (22) is positioned at the side of the drive element (20) which faces the first side (II) thereof. By means of this, the rotational movement of the drive element (20) can be detected.

The gearbox (30), in other words, the gear box provides adjustment of the revolution and the torque by changing the output rotation, received from the drive element (20), at predetermined proportions. In a possible embodiment of the present invention, the gearbox (30) is in harmonic type. The harmonic gear gearbox (30) is a gearbox (30) type which can provide high transfer proportions at low volume. Transfer is provided by means of synchronized rotation of gear circles engaged one above the other. It is mostly preferable for the actuator (10) since it operates in a silent manner. The gearbox (30) is connected to the first shaft (21) at the first side (II) and it is connected to at least one gearbox shaft (31) at the second side (III). Said gearbox shaft (31) provides the gearbox (30) to be connected to said dampening element (40) and provides force transfer.

The dampening element (40) provides transfer of the output rotation, received from the gearbox (30), to the drive cover (60) by means of at least partially dampening said output rotation. The dampening element (40) is an element which changes shape when it is subjected to bending or torsion forces and which can return to its prior form when the force, exerted thereon, is removed. In a possible embodiment of the present invention, the dampening element (40) is a spring. In another possible embodiment of the present invention, the dampening element (40) essentially has a unique shape and can be made of an elastic material. The dampening element (40) transfers the rotation, received from the drive element (20), by at least bending against a force which may occur on the drive cover (60). By means of this, elasticity is obtained in the joint of the robot (1) and sharp movements are prevented.

There is at least one first hole (41) and at least one second hole (42) on the dampening element (40). Said first hole (41) provides the dampening element (40) to be connected to the gearbox shaft (31). Said second shaft (51) provides the dampening element (40) to be connected to at least one frame (50).

Figure 3:
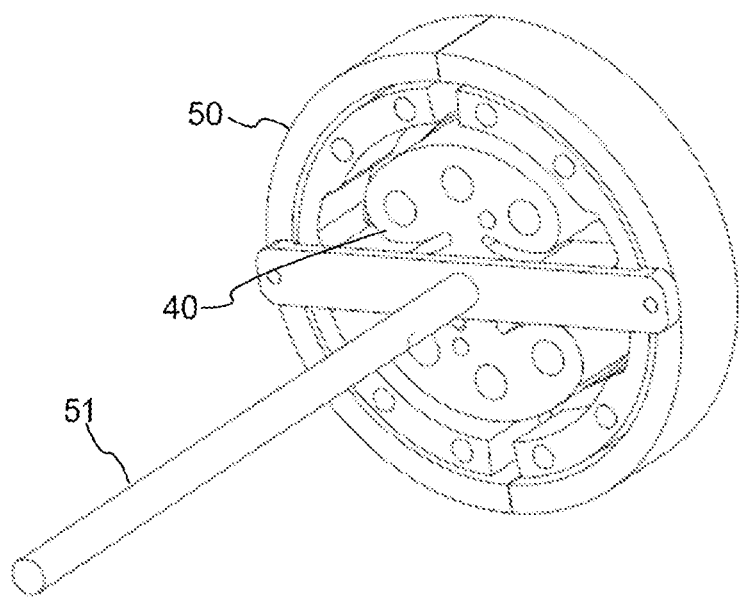
In FIG. 3, a representative perspective view of the elastic element, positioned in the subject matter actuator, and of a second shaft connected thereto is given.
Figure 4:
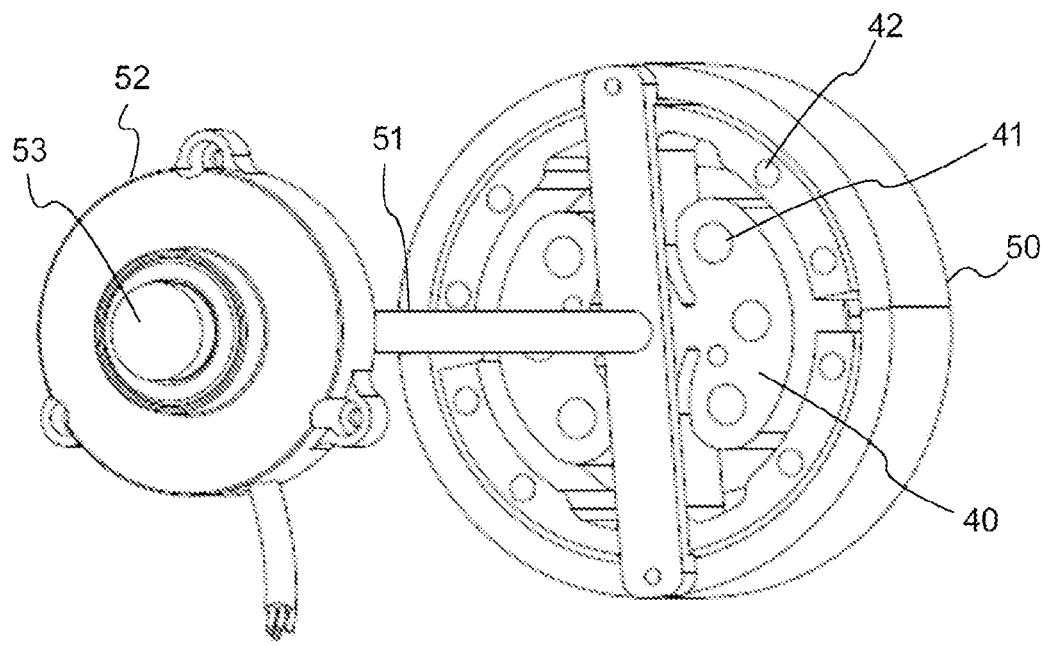
In FIG. 4, a representative cross-sectional view of the elastic element, positioned in the subject matter actuator, and of a second shaft connected thereto is given.

With reference to FIGS. 3 and 4, the dampening element (40) is connected to said frame (50). The frame (50) provides transfer of the rotation due to deformation, received from the dampening element (40), to the drive cover (60) from one side and to at least one second shaft (51) from the other side. Said drive cover (60) is the part which gives the output movement obtained by the final rotational force of the actuator (10). This part provides movement transfer by means of being associated with the part of the robot (1) desired to be moved. Said second shaft (51) extends in the extension direction (I) towards the first side (II) of the dampening element (40) in the body (11), and said second shaft (51) can be rotated around itself. The second shaft (51) essentially extends from the first side (II) of the body till the end thereof. The second shaft (51) is connected to at least one second encoder (52). Said second encoder (52) provides the rotational movement to be transformed into digital signal like the first encoder (22). In order to provide connection of the second shaft (51) to the second encoder (52), at least one fixation element (53) is provided. By means of this, the rotational movement, obtained at the output of the dampening element (40), is signalized.

Together with all of these embodiments, in the actuator (10), the output rotation, obtained from the drive element (20), is signalized from one side, and the rotational movement, obtained at the dampening element (40) output, is signalized from the other side. And while all of these processes are being realized, as the first encoder (22) and the second encoder (52) are positioned at the first side (II) of the body (11), the actuator (10) can be produced in smaller volumes.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. An actuator configured in movements of joints of robot systems, comprising:
    at least one drive element, wherein the at least one drive element provides a movement and is arranged between a first side of at least one body and a second side of the at least one body,
    at least one gearbox, wherein the at least one gearbox is configured to adjust the movement, obtained from the at least one drive element, and
    at least one dampening element, wherein the at least one dampening element is configured to at least partially dampen the movement, the at least one dampening element exists at at least one gearbox output, and the at least one dampening element is configured to transfer the movement to at least one drive cover,
    wherein the actuator comprises at least one first shaft provided between the at least one drive element and the at least one gearbox, and the at least one first shaft is configured to extend towards the first side and at least one first encoder, wherein
    the at least one first shaft and the at least one body are connected at the first side, in order to measure a detection of an output rotation received from the at least one drive element; and
    at least one second shaft is associated with the at least one dampening element and is configured to extend towards the first side and at least one second encoder positioned at the first side of the at least one body and associated with the at least one second shaft, in order to measure a detection of an output rotation received from the at least one dampening element,
    wherein the at least one dampening element and the at least one second shaft are connected to each other by means of at least one frame, and
    wherein the at least one frame is connectable to at least one second hole provided on the at least one dampening element.

2. The actuator according to claim 1, wherein at least one fixation element is provided between the at least one second shaft and the at least one second encoder for providing a connection in between.

3. The actuator according to claim 1, wherein the at least one first encoder and the at least one second encoder are provided at the first side of the at least one body.

4. The actuator according to claim 1, wherein the actuator is particularly configured in exoskeleton robots.

* * * * *